United States Patent
McNamara et al.

(10) Patent No.: US 7,944,122 B2
(45) Date of Patent: May 17, 2011

(54) SELF-CONTAINED VOLTAGE GENERATING SYSTEMS

(75) Inventors: William E. McNamara, Middletown, NY (US); John S. Kurek, Goshen, NY (US); Lisa Lamberty, Hawthorne, NJ (US); Ronald F. Vogel, New York, NY (US); Anthony D. Gonzalez, Oak Ridge, NJ (US); David Cerutti, Putnam Valley, NY (US); Gregory A. Ornoski, Cliffside Park, NJ (US)

(73) Assignee: Avon Products, Inc., New York, NY (US)

( * ) Notice: Subject to any disclaimer, the term of this patent is extended or adjusted under 35 U.S.C. 154(b) by 467 days.

(21) Appl. No.: 11/958,633

(22) Filed: Dec. 18, 2007

(65) Prior Publication Data

US 2008/0143214 A1    Jun. 19, 2008

Related U.S. Application Data

(60) Provisional application No. 60/875,467, filed on Dec. 18, 2006.

(51) Int. Cl.
    *H01L 41/08*    (2006.01)
(52) U.S. Cl. ...................................... 310/339
(58) Field of Classification Search .................. 310/311, 310/326, 328, 329, 339, 338; 132/293–297, 132/301, 317, 318; 206/581, 823
    See application file for complete search history.

(56) References Cited

U.S. PATENT DOCUMENTS

| | | | |
|---|---|---|---|
| 4,274,125 A * | 6/1981 | Vogel | 73/724 |
| 4,975,616 A | 12/1990 | Park | |
| 5,658,247 A | 8/1997 | Henley | |
| 5,775,344 A | 7/1998 | Clay | |
| 6,199,558 B1 | 3/2001 | Schmidt et al. | |
| 6,220,719 B1 | 4/2001 | Vetorino et al. | |
| 6,296,811 B1 | 10/2001 | Sasaki | |
| 6,423,017 B2 | 7/2002 | Brotz | |
| 6,502,587 B1 | 1/2003 | Kellum et al. | |
| 6,516,245 B1 | 2/2003 | Dirksing et al. | |
| 6,715,642 B2 | 4/2004 | Engel et al. | |
| 6,758,826 B2 | 7/2004 | Luettgen et al. | |
| 7,109,642 B2 | 9/2006 | Scott | |
| 7,669,605 B2 * | 3/2010 | Cho | 132/217 |
| 2005/0107831 A1 | 5/2005 | Hill et al. | |
| 2006/0032512 A1 | 2/2006 | Kress et al. | |
| 2006/0131996 A1 | 6/2006 | Choi et al. | |
| 2006/0232908 A1 | 10/2006 | Izumi et al. | |
| 2010/0089414 A1* | 4/2010 | Wyatt et al. | 132/217 |

* cited by examiner

*Primary Examiner* — Walter Benson
*Assistant Examiner* — Karen Addison
(74) *Attorney, Agent, or Firm* — Joan M. McGillycuddy; Charles J. Zeller (57) ABSTRACT

A self-contained voltage generating system is incorporated in a package or device for housing a product. There is at least one piezoelectric element incorporated in the package or device and the piezoelectric element generates a source of voltage when it is activated. The voltage is then used to perform various activities on other elements that are part of the package or device, such as operate a motor, provide heat, provide ultrasonic energy, furnish light, provide acoustic energy, and provide vibration energy. The piezoelectric elements are in the form of discrete particles, piezoelectric fibers, filaments, transducers, and actuators.

50 Claims, 9 Drawing Sheets

SELF-CONTAINED VOLTAGE GENERATING SYSTEMS

This application claims the priority of Provisional Application No. 60/875,467 filed Dec. 18, 2006.

BACKGROUND OF THE INVENTION

Cosmetic packages come in a variety of forms. Some containers are flexible, some are rigid and some are semi-rigid. These cosmetic containers can be made from glass, metal and plastic materials, or combinations thereof. Typically the container or package serves to hold, preserve and in most instances provide information about the cosmetic composition housed within.

Cosmetics are conventionally packaged in a variety of containers that may also include an applicator device. The applicator device is used to facilitate deposition or dispersal of the cosmetic product onto the desired target surface area of the person using the cosmetic product. Typical applicators include brushes, pads, sponges, combs, atomizer pump nozzles, spatulas, flocked tipped wands, and the like.

The term "cosmetics" is meant broadly to include skin creams, skin treatments, foundation, concealor, lipstick, lip gloss, mascara, eyeshadow, nail polish, shampoo, body wash, body powder, soap, and perfumes.

It is often necessary that the cosmetic package or applicator perform some function that requires a source of voltage. Typically, this voltage source is provided by a battery or from an alternating current ("AC") or direct current ("DC") voltage source, such as an electrical outlet.

The voltage can be used to operate a motor, provide heat, provide ultrasonic energy, or to furnish light.

DETAILED DESCRIPTION OF THE INVENTION

The present invention generally relates to self-contained voltage generating systems. The self-contained voltage generating system generally comprises:

(a) a package or device for housing a product;

(b) at least one piezoelectric element incorporated in said package or device that generates a source of voltage;

(c) means for activating the piezoelectric element to generate the source of voltage; and (d) means for utilizing the voltage generated by the piezoelectric element. The piezoelectric element can be in the form of discrete particles and/or fibrous material. The package or device comprises a first enclosed space for housing the product, and a second enclosed space surrounding the first enclosed space. The first enclosed space is generally contacted with an induction coil or other equivalent means and the second enclosed space houses magnetic means that oscillate within said second enclosed space, thereby generating an electric charge in the induction coil. The package or device also includes a capacitor or other equivalent means for storing the electric charge, a rectifier or other equivalent means connected to the capacitor and means for conducting current flowing in the coil to charge the capacitor. The package or device also incorporates means for performing a function selected from the group consisting of operating a motor, operating a pump, providing ultrasonic energy, furnishing light, providing acoustic energy, and providing vibration energy. The package or device can house cosmetic products such as cosmetic formulations, cosmetic packaging and cosmetic applicators There is no need for a battery or external power supply. Once the charge is depleted, the package or device can be indefinitely re-charged simply by shaking it for a prescribed amount of time. The invention is environmentally friendly in that it i) uses renewable energy sources as opposed to batteries or disposable hazards and ii) in certain cases, such as electromechanically powered spray pumps, does away with the need for environmentally unfriendly chemicals such as CFCs.

The voltage generating materials can be used in various configurations such as discrete particles piezoelectric fibers or filaments, which can be bundled in a parallel array to make a transducer or laid down in a flat mono-layer to serve as an actuator. The discrete particles, fibers, transducers or actuators that generate the voltage can also be referred to broadly as "piezoelectric elements". Methods for producing piezoelectric elements are disclosed in U.S. Pat. No. 7,109,642 B2 to Scott, et al, which is incorporated by reference herein.

The specific voltage generating materials of the present invention possess the ability to generate voltage when subjected to mechanical stress. The piezoelectric element remains the same throughout the invention in that the element generates electrical energy from mechanical stress. However, the end point usage of this energy will vary greatly depending upon the personal care needs associated with the consumer and or product type.

The voltage generating properties of such piezoelectric elements are based on a piezoelectric effect, that is, the ability of certain crystals making up the piezoelectric element to generate a sufficiently high voltage for the cosmetic application in response to mechanical stress. A typical voltage range can vary from about 0.01 volt to about 40,000 volts. Various applications require different amounts of voltage. For example, when the present invention relates to illumination, the voltage requirement can vary from 2 volts to more than 120 volts. The mechanical stress can arise from motion, vibration or compression. This mechanical stress can be provided by the consumer user or from some other source such as mechanical vibrations generated from vehicles.

In a piezoelectric crystal, the positive and negative electrical charges are separated and symmetrically distributed, so that the overall crystal charge is electrically neutral. The piezoelectric crystal forms an electric dipole. Dipoles adjacent to each other tend to be aligned in regions called Weiss domains. When mechanical stress is applied, the symmetry is disturbed and changes on the crystal become asymmetric. The charge asymmetry generates a voltage across the crystal material. For example, one cubic centimeter of quartz experiencing a 500 pound force (lbf), which is equivalent to two kilo-newtons, can produce 12,500 volts.

Piezoelectric crystals acquire a charge when compressed, twisted or distorted. Quartz demonstrates this property along with Rochelle salt, barium titanate, lead zirconate and lead titanate, stabilized zirconia, silicone carbide, tin oxide, hydroxyl apatite, titanium dioxide, aluminum oxide, zirconium diboride, and single crystal relaxor materials to name a few.

Piezoelectric fibers are either bundled in a parallel array or laid out in a flat monolayer. When the fibers are bent, flexed or compressed they generate electric charge. When the fibers are exposed to an electric or magnetic field they mechanically deform.

Piezoelectric fiber composites can be flexible and comfortable or completely rigid. There is no limitation to size and they can be produced in a variety of diameters. Piezoelectric materials provide a convenient transducer effect between electrical and mechanical oscillations. The piezoelectric fibers can be used in a hairbrush, allowing the brush to be self-heating. As the fibers are mechanically bent the mechanical energy is converted to electrical energy used to power a brush heater.

Piezoelectric fibers in dry foundation applicators can also supply static charge needed to adhere make-up to the applicator. Furthermore, this material could be used in almost any cosmetic applicator made of bristles.

The voltage created to generate an electric field within the package can also be coupled with a halochromic material, which changes color due to changes in pH, so as to trigger color change.

Piezoelectric effect is the ability of certain crystals to generate a high voltage in response to applied mechanical stress, such as body motion, vibration or compression. The piezoelectric effect is reversible in that piezoelectric crystals, when subjected to an externally applied voltage, can change shape by a small amount. Some useful applications of piezoelectric materials are the production and detection of sound, generation of high voltages, electronic frequency generation, microbalance, and ultrafine focusing of optical assemblies.

Thus, self-contained piezoelectric elements associated with cosmetic products can generate sufficient energy to provide power to such cosmetic products to facilitate the objective of the cosmetic product through the conversion of mechanical energy to electrical energy Relationships between applied forces and the resultant responses depend upon, the piezoelectric properties of the piezoelectric ceramic or polymer, the size and shape of the crystal; and the direction of the electrical and mechanical excitation.

The ratio of (a) the stored converted energy of one kind, either mechanical or electrical to (b) the input energy of the second kind, either electrical or mechanical is defined as the square root of the coupling coefficient, k, where:

$$k = \sqrt{\frac{\text{mechanical energy stored}}{\text{electricaal energy applied}}}$$

or $$k = \sqrt{\frac{\text{electrical energy stored}}{\text{mechanical energy applied}}}$$

Electromechanical coupling coefficients $k_{33}$, $k_{31}$, $k_p$, and $k_{15}$ define the conversion of energy by the ceramic element from electrical to mechanical form or vice versa. The subscripts designate the relative directions of electrical and mechanical quantities and the kind of motion involved. For example, they can be associated with vibratory modes of certain simple transducer shapes. Thus, $k_{33}$ is appropriate for a long thin bar, with electrodes on the ends, and polarized along the length, and vibrating in a simple length expansion and contraction. $k_{31}$ relates to a long thin bar, with electrodes on a pair of long faces, polarized in thickness, and vibrating in simple length expansion and contraction, $k_p$ signifies the coupling of electrical and mechanical energy in a thin round disc, polarized in thickness and vibrating in radial expansion and contraction. $k_{15}$ indicates the energy conversion in a thickness shear vibration. Since these coefficients are energy ratios, they are dimensionless. These dimensionless numbers are related to the ratio of the energy stored in the mechanical and electrical portions of the material. The first subscript indicates the direction of the electric field and the second indicates the direction of the mechanical strain expressed in percent.

There are thirty-two different crystal classes. Of the thirty-two crystal classes, twenty-one are non-centrosymmetric, that is, not having a center of symmetry. Twenty of these crystal classes exhibit direct piezoelectricity. The twenty-first crystal is the cubic class, 432.

Ten of the crystal classes are polar, that is, they spontaneously polarize, having a dipole in their unit cell, and exhibit piezoelectricity. If this dipole can be reversed by the application of an electric field, the material is said to be ferroelectric.

The ferroelectric effect is an electrical phenomenon whereby certain ionic crystals and piezoelectric polymers can exhibit a spontaneous dipole moment, which can be reversed by the application of an electric field. The term ferroelectricity is used in analogy to ferromagnetism in which a material exhibits a permanent magnetic moment.

The magnetic moment of atoms in a ferromagnetic material cause them to behave like permanent magnets. Magnets may be employed in the present invention to produce electrical energy from mechanical energy There are two main types of ferroelectrics: displacive and order-disorder. The effect in barium titanate, a typical ferroelectric of the displacive type, is due to a polarization catastrophe, in which, if an ion is displaced from equilibrium slightly, the force from the local electric fields due to the ions in the crystal increase faster than the elastic-restoring forces. This leads to an asymmetrical shift in the equilibrium ion positions and hence to a permanent dipole moment. In an order-disorder ferroelectric, there is a dipole moment in each unit cell, but at high temperatures they are pointing in random directions. Upon lowering the temperature and going through the phase transition, the dipoles order, all pointing in the same direction within a domain.

The most desired configuration is having the dipoles ordered, that is, all pointing in the same direction. The voltage is then able to propagate in one concentrated direction. The piezoelectric effect is present even if the dipoles are not all aligned however, in this case the piezoelectric effect is not as powerful. Amorphous polymers can also exhibit some degree of piezoelectricity depending upon time, pressure and temperature.

The piezoelectric crystal classes are as follows: 1, 2, m, 222, mm2, 4, −4, 422, 4 mm, −42 m, 3, 32, 3 m, 6, −6, 622, 6 mm, −62 m, 23, −43 m. Materials that fall into these crystal classes can be utilized in the present invention. Piezoelectricity is the combined effect of the electrical behavior of the material:

$$D = \in E$$

where D is the electric displacement, $\in$ is permittivity and E is electric field strength, and Hook's Law:

$$S = sT$$

Where S is strain, s is compliance and T is stress.

These relationships can be combined into coupled equations, of which the strain-charge form is:

$$\{S\} = [s^E]\{T\} + [d_t]\{E\}$$

$$\{D\} = [d]\{T\} + [\in^T]\{E\},$$

where d represents the piezoelectric constants, and the superscript E a zero, or constant electric field. The superscript T represents a zero, or constant stress field. The subscript t represents the transposition of a matrix.

The strain-charge for a material of the 6 mm crystal class such as a poled piezoelectric ceramic, for example PZT may also be written as:

$$\begin{bmatrix} S_1 \\ S_2 \\ S_3 \\ S_4 \\ S_5 \\ S_6 \end{bmatrix} = \begin{bmatrix} s_{11}^E & s_{12}^E & s_{13}^E & 0 & 0 & 0 \\ s_{12}^E & s_{11}^E & s_{13}^E & 0 & 0 & 0 \\ s_{13}^E & s_{13}^E & s_{33}^E & 0 & 0 & 0 \\ 0 & 0 & 0 & s_{44}^E & 0 & 0 \\ 0 & 0 & 0 & 0 & s_{44}^E & 0 \\ 0 & 0 & 0 & 0 & 0 & s_{66}^E = 2(s_{11}^E - s_{12}^E) \end{bmatrix} \begin{bmatrix} T_1 \\ T_2 \\ T_3 \\ T_4 \\ T_5 \\ T_6 \end{bmatrix} + \begin{bmatrix} 0 & 0 & d_{31} \\ 0 & 0 & d_{31} \\ 0 & 0 & d_{33} \\ 0 & d_{15} & 0 \\ d_{15} & 0 & 0 \\ 0 & 0 & 0 \end{bmatrix} \begin{bmatrix} E_1 \\ E_2 \\ E_3 \end{bmatrix}$$

$$\begin{bmatrix} D_1 \\ D_2 \\ D_3 \end{bmatrix} = \begin{bmatrix} 0 & 0 & 0 & 0 & d_{15} & 0 \\ 0 & 0 & 0 & d_{15} & 0 & 0 \\ d_{31} & d_{31} & d_{33} & 0 & 0 & 0 \end{bmatrix} \begin{bmatrix} T_1 \\ T_2 \\ T_3 \\ T_4 \\ T_5 \\ T_6 \end{bmatrix} + \begin{bmatrix} \epsilon_{11} & 0 & 0 \\ 0 & \epsilon_{11} & 0 \\ 0 & 0 & \epsilon_{33} \end{bmatrix} \begin{bmatrix} E_1 \\ E_2 \\ E_3 \end{bmatrix}$$

Some polymeric materials can form crystalline regions. However, the length of the polymer will usually prevent complete crystallization. The polymer will then be classified as semi-crystalline.

In order to transform these polymeric materials into piezoelectric materials, semi-crystalline polymers must have a polar crystalline phase. Mechanical orientation, thermal annealing and high voltage treatment are all effective in inducing crystalline phase transformations.

Mechanical orientation, thermal annealing and high voltage treatment are all effective in inducing crystalline phase transformations. The three aforementioned treatments essentially work to stretch the polymer network resulting in alignment of the amorphous strands in the film plane thus accomplishing uniform rotation of the crystallites by an electric field. Depending on whether the stretching is uniaxial or biaxial, the electrical and mechanical properties, and therefore the transduction response, are either highly anisotropic or isotropic in the plane of the polymer sheet.

Electrical poling is accomplished by applying an electric field across the thickness of a polymer. An electric field on the order of 50 millivolts/meter (Mv/m) is usually sufficient to effect crystalline orientation. Polymer poling can be accomplished using direct contact or corona discharge. When poled, a polymer such as polyvinylidene difluoride (PVDF) is a ferroelectric polymer, exhibiting efficient piezoelectric properties. Other useful polymeric materials include polyvinylidene fluoride and its copolymers with trifluoroethylene (TrFE) and tetrafluoroethylene (TFE), polyamides (Nylon), polyureas, liquid crystalline polymers, biopolymers and combinations thereof.

For example, a piezoelectric actuator is most efficient when its mechanical impedance matches its structural impedance. Mechanical impedance is a measure of how much a structure resists motion when subjected to a given force. It relates forces with velocities acting on a mechanical system. The mechanical impedance of a point on a structure is the ratio of (a) the force applied to the point and (b) the resulting velocity at that point. Mechanical impedance is the inverse of mechanical admittance or mobility. The mechanical impedance is a function of the frequency ω of the applied force and can vary greatly over frequency. At resonance frequencies, the mechanical impedance will be lower, meaning less force is needed to cause a structure to move at a given velocity. Thus, $$f(\omega) = Z(\omega)v(\omega)$$

wherein, f is the force vector, v is the velocity vector, Z is the impedance matrix and ω is the frequency.

Electrical impedance is a measure of opposition to a sinusoidal electric current, alternating or AC current. The concept of electrical impedance generalizes Ohm's Law to AC circuit analysis.

Four essential elements exist for all piezoelectric polymers regardless of morphology. These elements are: (1) the presence of permanent molecular dipoles; (2) the ability to orient or align the molecular dipoles; (3) the ability to sustain the dipole alignment once it is achieved; and (4) the ability of the material to undergo large strains when mechanically stressed.

The polymer polyvinylidene difluoride, PVDF, exhibits piezoelectricity several times greater than quartz. Apatite crystals also exhibit piezoelectric properties. Apatite usually refers to hydroxyapatite, fluorapatite, and chlorapatite, named for high concentrations of $OH^-$, $F^-$, or $Cl^-$ ions, respectively, in the crystal. The formula of the admixture of the three most common species can be represented as $Ca_5(PO_4)_3(OH, F, Cl)$.

Materials other than polymers can exhibit a piezoelectric effect. These materials include quartz and quartz analogue crystals such as berlinite ($AlPO_4$), gallium orthophosphate ($GaPO_4$), and ceramics with perovskite or tungsten-bronze structures ($BaTiO_3$, $SrTiO_3$, $Pb(ZrTi)O_3$, $KNbO_3$, $LiNbO_3$, $LiTaO_3$, $BiFeO_3$, $Na_xWO_3$, $Ba_2NaNb_5O_5$, $Pb_2KNb_5O_{15}$).

The piezoelectric filaments or fibers can range in diameter from a few angstroms to larger that a millimeter.

Methods for producing flexible refractory filaments are disclosed in U.S. Pat. No. 5,827,797 to Cass, et al which is incorporated by reference herein. Table 1 which follows, lists physical and electrical properties associated with exemplary refractory filaments made by Advanced Cerametrics Inc. Hard and soft piezoelectric materials are shown which can be used in the present invention. Hard or high powered piezoelectric ceramics withstand high levels of electrical excitation and mechanical stress. The hard piezoelectric is suited for high voltage or high power generators and transducers. Hard piezoelectric ceramics are more resistant to stress induced depolarization compared to soft piezoelectrics. A high load or distortion constant, low hysteresis and high Qm characterize hard piezoelectrics. Mechanical Qm or quality factor provides an indication of the relative steepness or gradient of mechanical vibration resonance near the resonant frequency.

Soft piezoelectrics are less resistant to stress induced depolarization compared to hard piezoelectrics. These soft ceramics feature high sensitivity and permittivity. Typically, soft piezoelectrics are used in various sensors, low-power motor-type transducers, receivers, and low power generators.

TABLE 1

| Properties | PZT-8 (Hard) | PZT-5A (Soft) | PZT-5H (Soft) |
|---|---|---|---|
| Density | 7.5 | 7.5 | 7.45 |
| Young's Modulus ($10^{10}$ N/m$^2$) | 9.3 | 6.6 | 6.4 |
| Curie Temperature (° C.) | 300 | 350 | 190 |
| Mechanical Q | 900 | 100 | 85 |
| Dielectric Constant (1 kHz) | 1100 | 1725 | 3450 |
| Dissipation Factor (1 kHz) | 0.3 | 2 | 2 |
| $k_{31}$ | 0.33 | 0.36 | 0.38 |
| $k_p$ | 0.56 | 0.62 | 0.64 |
| $k_p$ | 0.66 | 0.72 | 0.75 |
| $k_p$ | 0.59 | 0.69 | 0.68 |
| $d_{31}$ ($10^{-12}$ m/V) | −107 | −173 | −262 |
| $d_{33}$ ($10^{-12}$ m/V) | 241 | 380 | 583 |
| $d_{15}$ ($10^{-12}$ m/V) | 382 | 582 | 730 |
| $g_{31}$ ($10^{-3}$ Vm/N) | −10.9 | −11.5 | −8.6 |
| $g_{33}$ ($10^{-3}$ Vm/N) | 24.8 | 25 | 19.1 |
| $g_{15}$ ($10^{-3}$ Vm/N) | 28.7 | 38.2 | 28.9 |
| $s_{11}^E$ ($10^{-12}$ m$^2$/N) | 10.8 | 15.2 | 15.6 |
| $s_{12}^E$ ($10^{-12}$ m$^2$/N) | −3.6 | −5.3 | −4.7 |
| $s_{33}^E$ ($10^{-12}$ m$^2$/N) | 13.7 | 18.3 | 19.8 |

Furthermore, transducers and actuators comprising the aforementioned refractory filaments are also useful in the present invention. The present invention can be utilized with cosmetic compositions, packages, containers, and applicator configurations. This includes self-heating packages such as hot melt face masks and depilatories for personal care; self-heating cosmetic applicators for mascara and lip applications and for deposition of dry foundation; self-heating pad applicators for creams and lotions for skin treatment and personal care, mechanical movement applicators for mascara and lip applications; mechanical movement pads for exfoliation treatments for the skin; self-heating hair brushes for personal care and grooming that heat up due to the mechanical action of pulling the brush through the hair and/or the bending of the piezoelectric impregnated bristles as the bristles contact the head; color changing cosmetics for skin, hair and lips, self illuminating packages such as fragrance bottles and compacts with mirrors that allow the person to view an activity such as the application of a cosmetic, and electric field producing packages or applicators for enhanced skin penetration or release of a biologically active agent from a carrier.

Some examples of cosmetic products are insect repellents, anti-aging creams, facial masks, lipsticks, shave creams, depilatories, skin protectants, moisturizers, hair care products, toothpaste, anti-fungal powders, skin patches, lip balms, and personal cleansing wipes.

A self-contained piezoelectric impregnated hairbrush can generate its own heat from the motion encountered during the brushing process. Such a piezoelectric heated brush can dry the hair without the use of a conventional hair dryer activated by a power cord plugged into an electrical outlet, or a battery operated system.

In one embodiment, the piezoelectric fibers or filaments can be combined with conventional bristles, such as nylon in alternating row configurations. The piezoelectric material will generate voltage due to the mechanical stress that occurs during the brushing process. This voltage can be collected via a capacitor device to store sufficient electrical energy to operate a heating element embedded in the shaft of the brush.

A similar configuration can be used for a mascara applicator wherein the fibers of a typical mascara brush can be combined with piezoelectric filaments to generate electrical energy that operates a heating element, ultrasonic device, static discharge device, rotary or vibratory motion motor to aid the deposition or distribution of mascara onto the eyelashes, separation of lashes, curling of lashes or to improve the overall appearance of a mascara coated eyelash.

Piezoelectric filaments can also be combined with the bristles of a nail polish applicator brush. The flex or bending stress associated with the brush application of nail polish can generate electrical energy for various applications, such as heat, ultrasonic discharge or vibratory discharge to dispense or disperse the polish material, and/or enhance its appearance.

The piezoelectric element can also be used to supply energy needed to drive acoustic applications. For example, the piezoelectric element can be integrated into a hairbrush. Instead of using heat to evaporate the water from the hair, the water can be physically removed from the hair shaft by converting the electrical energy into acoustic energy.

Sound produces vibrations in materials because sound consists of pressure waves in air, or other materials. The pressure in the waves "pushes" on objects, but being a wave, it is changing rapidly, pushing harder and softer repeatedly many times a second. This pushing causes the material subjected to the sound to vibrate. It is this acoustically induced vibration that displaces the water droplets from the hair shaft. The words acoustic and vibration are used interchangeably herein.

The piezoelectric element can supply electrical energy that can be converted into acoustic energy by a transducer built into the brush. Depending upon the type of transducer selected, one could vary the frequency required to most effectively remove the water from the hair.

The piezoelectric element can be incorporated into skin pads, sponges, nail polish brushes, massage bars, skin brushes and wand type applicators to provide a tactile sensation such as vibration. This self-contained source of vibration can be used for massage therapy, to help spread or distribute a cosmetic composition, or to serve as an indicator to mark or monitor some event related to the human body.

Muscle tone, as it relates to the human body, is the continuous and passive partial contraction of the muscles. Unconscious nerve impulses maintain the muscles in a partially contracted state. If a sudden pull or stretch occurs, the body responds by automatically increasing the muscle tension, a reflex which helps guard against danger as well as helping to maintain balance.

The piezoelectric element can be made flexible and incorporated into a muscle wrap to monitor the level of muscle tension. This muscle wrap would be able to sense abnormal muscle tension leading up to a muscle pull event. It would generate electricity by converting the mechanical energy in the form of vibrations into electrical energy to activate or trigger an alarm. The alarm would make the individual aware that he or she is reaching a critical point after which muscle injury is inevitable. Additionally such a configuration can be used not only to sense a tension event but also counteract such an event by vibration stimulation.

A piezoelectric element can be used to energize a self-contained ultrasonic mixer in a package or container. Thus, a cosmetic composition can be mixed using ultrasonic energy by way of cavitation. Cavitation can be used to homogenize, or mix and break down suspended particles in a colloidal liquid cosmetic composition. Methods to produce circulation or mixing are disclosed in U.S. Pat. No. 6,123,412 to Kabushiki et al which is incorporated by reference herein.

Piezoelectric technology can also be incorporated into the design of a cosmetic applicator such as a mascara brush or lip applicator to provide a self-contained source of heat or acoustically driven, vibration energy during movement of the applicator to improve cosmetic application or to assist in transferring the composition from the applicator to the recipient.

For example it is often difficult to transfer the mascara composition from the applicator brush onto eyelashes. These compositions are generally highly viscous and contain fine particulate materials that often adhere to the bristles of the mascara applicator. The piezoelectric element can impart heat to reduce the viscosity of the mascara composition, enabling it to flow more readily from the applicator brush onto the eyelashes.

Additionally, the piezoelectric element can be used to energize an acoustic applicator that would dispense or distribute the cosmetic composition from the applicator via vibrations.

A rotating or linearly movable applicator blended with a piezoelectric material can enhance the deposit of such cosmetic products as mascara or lip products. Standard mascara and lip applicators often utilize filaments such as nylon for the application of viscous mascara or lip compositions. The application requires the use of both rotary and linear movement of the applicator across the application surface, either lashes or lips. For example, in mascara application, a person will apply mascara to the lashes by moving a brush through the eyelashes in a combing-like motion.

To aid in the deposition or contacting of the mascara onto the lashes, a person will typically rotate and/or linearly move the brush rapidly in a direction perpendicular to the shaft of the lash. This action aids in transferring the mascara composition from the brush to the lash and improves the separation between each lash, thereby reducing the accumulation of the mascara composition on the lash. In this embodiment, an applicator with self-contained mechanically assisted movement, either rotational or linear can aid in the speed and consistency of application.

The piezoelectric filaments disclosed in the aforementioned U.S. Pat. No. 5,827,797 to Cass, et al can be used to combine with or replace conventional nylon or other equivalent bristle filaments. The action of application can generate sufficient electrical energy to energize a mechanical motor which can rotate, agitate, vibrate or move the applicator linearly to aid in cosmetic application.

Furthermore, any cosmetic applicator or device can be made to self-contain the filaments and/or fibers that provide the necessary electrical energy to perform the appropriate cosmetic operation.

Packages and containers can be designed to utilize the voltage from piezoelectric technology to create mechanical movement. Voltage can be used in many package forms for a wide variety of applications including mechanical movement. As noted above, in mascara or lip application—linear, rotational, vibratory or oscillating mechanical movement aid in the deposition and distribution of the cosmetic composition onto the intended application surface of the recipient.

This mechanical movement can be incorporated in self-contained packages or containers having creams, lotions, or gel compositions that are applied to the skin surface in a rotary or linear manner to spread and distribute the composition evenly across the surface of the skin.

In a similar fashion, the self-contained piezoelectric elements of the present invention can generate sufficient energy to illuminate light emitting devices in compact mirrors, lighted implements or applicators and/or decorative functions associated with package design for cosmetic materials.

Piezoelectric elements can also provide a self-contained photoelectric effect for energizing light emitting diodes or other light emitting components, for example, to provide light for compact mirrors and other cosmetic applicators.

Incorporating piezoelectric elements that are activated by mechanical shaking, such as by hand before use, can supply voltage for self-mixing, self-heating, and self-illuminating packages. These self-contained piezoelectric energizing packages can catalyze phase transition or alter rheological characteristics of cosmetic compositions.

For example, such self-contained piezoelectric packages can change a thick or highly viscous cosmetic formulation into a thin, low viscosity or free flowing composition. Additionally, piezoelectric elements can be used to catalyze various transitions. These transitions can be conformational such that a structural change takes place in a material to trigger the release of a biologically active agent or agents. This can manifest itself in a degradation or alteration by chemical, conformational or physical means.

There are various ways to accomplish active material release. One example involves encapsulation of the active by some other material. These materials can be solids, semi-solids, or liquids. Usually some degradation process takes place by which the encapsulating materials are eroded through chemical alteration, chemical reaction or in some cases physical degradation. The present invention can utilize a piezoelectric element to generate voltage and convert the generated electrical energy into acoustic energy. The resulting sound waves would act as the catalyst for the degradation of the encapsulating material.

In chemical kinetics, it has been observed that ultrasound can greatly enhance chemical reactivity in a number of systems, effectively acting as a catalyst by exciting the atomic and molecular modes of the system, such as the vibrational, rotational, and translational modes. In addition, in reactions that use solids, ultrasound breaks up the solid pieces from the energy released from the bubbles created by cavitation collapsing through them. This gives the solid reactant a larger surface area for the reaction to proceed over, thereby increasing the observed rate of reaction.

Skin treatment or skin care products can utilize self-contained heating or vibratory applicators driven by piezoelectric elements that provide electrical energy that is converted to vibratory or heat energy as an alternative to altering the entire package and its contents.

To heat an entire package and its contents takes much more energy in comparison to heating the tip of an applicator. Also, the vibration may be desired only for a relatively short time, such as during the application of the make-up product to the skin's surface. The lesser amount of energy needed reduces the amount of piezoelectric material and accompanying circuitry which reduces cost and helps to keep components small.

The applicator can thus manipulate a specified quantity of product deposited thereon and provide an altering effect such as heating, warming, mixing, or any other alteration or operation that is dependent on energy during application to the skin. In most skin treatment products, some form of applicator is used to apply the skin care composition from the package to the skin surface. Many of these implements or applicators are in the form of a sponge, cloth, textile pads, brushes and the like.

A cosmetic composition is released from an applicator due to the movement and pressure of the applicator against the skin surface. The addition of heat or vibratory energy to the applicator can aid in the deposition and release of a composition from the applicator. The addition of a piezoelectric element incorporated into such applicator will utilize the self-contained mechanical energy associated with the application process to enhance the delivery of a composition to the skin or application surface.

The voltage created by the piezoelectric element can also be used to generate an electric field. The electric field can be used to activate electrochemical reactions such as oxidation or reduction. The elements involved in an electrochemical reaction are characterized by the number of electrons contained by each element. The oxidation state of an ion is the number of electrons it has accepted or donated in relation to its neutral state, which is defined as having an oxidation state of zero.

If an atom or ion donates an electron in a reaction, its oxidation state is increased. If an element accepts an electron its oxidation state is decreased. For example, when sodium reacts with chlorine, sodium donates one electron and gains an oxidation state of +1. Chlorine accepts the electron and gains an oxidation state of −1. The sign of the oxidation state, either positive or negative, corresponds to the value of the electronic charge on each ion.

The attraction of the differently charged sodium and chlorine ions results in the formation of an ionic bond. Ionic bonds are based on electrostatic forces between two oppositely-charged ions. The piezoelectric element can be used to promote, alter or break ionic bonds or promote movement of electrons to deliver an effect or set of effects.

This activity can also be used to alter the rheology of a cosmetic composition. Chelation can be used as a drug active release reliant on ionic bond breakage. Chelation is the process of reversible binding or complexation of a ligand. The chelator, chelating agent, sequestering agent, or complexing agent combine with a metal ion, to form a metal complex. The term is generally reserved for complexes in which the metal ion is bound to two or more atoms of the chelating agent, although the bonds may be any combination of coordination or ionic bonds. The aforementioned electric field could disrupt the ionic bonds thus separating the complex and releasing an active ingredient.

Self-contained electric field producing hair brushes can be used to discharge the static electricity associated with fly away hair, hair tangles and hair knots. Excess built up static electricity on the hair can be neutralized by a charged piezoelectric element containing object. The presence of this charged object, more specifically, the piezoelectric impregnated brush creates an electric field that causes electrical charges on the hair to redistribute themselves such that the attractive force between hair fibers is eliminated and the fibers no longer have an affinity to stick to one another.

This redistribution can be characterized as an electrostatic discharge. Electrostatic discharge is defined as the transfer of charge between bodies at different electrical potentials. The electrical potential of the piezoelectric brush differs from that of the potential associated with the hair fibers resulting in a discharge. The present invention can thereby minimize or eliminate the effects of flyaway hair, hair tangles and hair knots caused by static electricity.

Self-contained electric field producing packages and/or applicators can be used for site-specific dermal penetration by disruption of the skin. The piezoelectric element can provide the source of the electric field and enhance skin penetration via iontophoresis. Iontophoresis works by applying a small electric current to the skin. This provides the driving force to enable penetration of charged molecules into the skin.

A drug reservoir is placed on the skin under the active electrode with the same charge as the penetrant. An indifferent counter electrode is positioned elsewhere on the body. The active electrode effectively repels the active substance and forces it into the skin. The number of charged molecules that are moved across the barrier, correlates directly to the applied current and thus can be controlled by the current density. Other factors include the possibility to increase the permeability of the skin barrier in the presence of a flow of electric current and electro-osmosis.

Another aspect of the present invention is a cosmetic composition that contains one or more piezoelectric elements as discrete particles within the composition itself. These discrete particles exhibit a permanent dipole moment. Permanent dipoles occur when two atoms in a molecule have substantially different electronegativity. Thus, one atom attracts electrons more than another becoming more negatives while the other atom becomes more positive. The dielectric constant of a material is a number that reflects the electrical properties of that material. The piezoelectric particles exhibit very large dielectric constants in relation to other ordinary polar materials.

TABLE 2

Approximate Dielectric Constants of Some Materials at Room Temperature

| Material | Dielectric constant |
|---|---|
| Vacuum | 1 (by definition) |
| Air | 1.00054 |
| Polyethylene | 2.25 |
| Paper | 3.5 |
| PTFE (Teflon(TM)) | 2.1 |
| Polystyrene | 2.4-2.7 |
| Pyrex glass | 47 |
| Rubber | 7 |
| Silicon | 11.68 |
| Methanol | 30 |
| Water (20° C.) | 80.10 |
| Barium titanate | 1200 |

Instantaneous dipoles occur due to chance, when electrons happen to be more concentrated in one place than another in a molecule, creating a temporary dipole. Induced dipoles occur when one molecule with a permanent dipole repels another molecule's electrons, "inducing" a dipole moment in that molecule. Both of the aforementioned dipole conditions can be catalyzed by the permanent dipole moment material and an attractive electrostatic force between the permanent dipole material (the piezoelectric particle) and either the instantaneous dipole or induced dipole material.

Van der Waals forces and electrostatic forces contribute to particle adhesion. Due to these forces, the piezoelectric particles of the present invention may adhere to materials having a dipole moment that differs from their own and/or to materials capable of undergoing instantaneous or induced dipole transitions.

For example, the piezoelectric particles could adhere to iron oxide particles thus imparting different performance properties compared to iron oxide neat. The performance properties can result in increased colloidal stability, increased photo-stability, change in color, and increased repulsion of solvents.

The present invention can comprise a two-part composition, in which part one would contain a material or materials capable of interacting with the piezoelectric particles contained in part two. Part one would be applied to the substrate of choice. Part two of the system would then be applied resulting in a selective adhesion to only the materials capable of interacting with the piezoelectric particles.

Such particles can be used in a layering type cosmetic. This layering cosmetic composition can be selective on the basis of positive and/or negative charge distribution. Thus, the forces listed above would be the determining factors for adhesion of the composition to the target substrate as well as adhesion between compositional elements within the same composition or separate compositions used in a synergistic fashion.

A typical renewable energy packaging device would comprise i) a hollow volume to store the material to be delivered ii) a charging magnet or magnets placed in and sized to freely oscillate in a chamber or chambers within the device, iii) a wire coil or coils wrapped around the device so that the charging magnet(s) slide through the coils, iv) an electronics assembly for storage of generated energy and v) an element that utilizes the current generated by the stored charge.

When the device is shaken, the magnet(s) oscillates within the device and passes through the inner cross section of the coils, generating an alternating current in the coil. The electronics assembly within the device includes a capacitor for storing charges, a rectifier connected to the capacitor, and means for conducting current flowing in the coil to the rectifier, to charge the capacitor. Various elements, such as but not limited to a heat exchanger, electric motor or pump, can be connected to the capacitor by means of a switch (which can be electric or magnetic), and utilize the current generated by the stored charge when the switch is switched on. The package may be disposable, recyclable and/or refillable.

Figure 1:
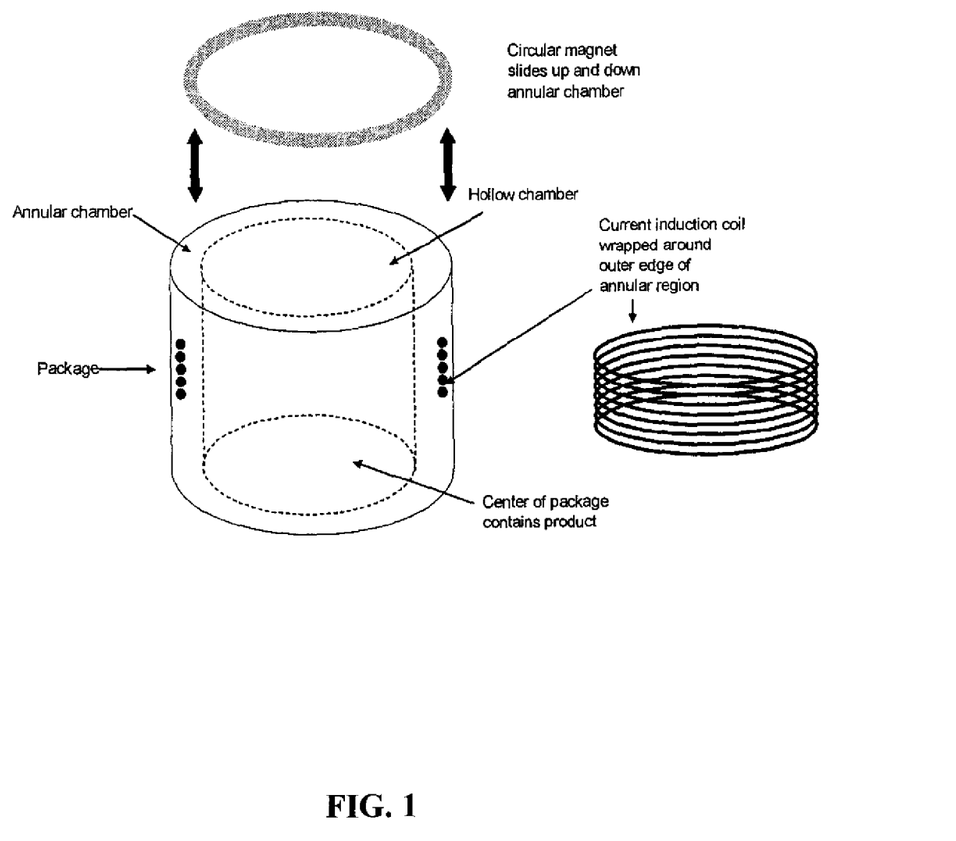
FIGS. 1 and 2 are simplified perspective diagrams of a renewable energy packaging device.

Referring to the drawings, FIG. 1 shows in simplified perspective form one package configuration wherein the package consists of a hollow chamber or reservoir to house the cosmetics composition, and an annular chamber encompassing the reservoir. Contained within the annular chamber is an anchored induction coil running around the outer edge of the annular chamber and a circular magnet or set of magnets fitted such that the magnet(s) freely move or oscillate up and down in said annular chamber. When the package is shaken the circular magnet travels past the induction coil resulting in the creation of an electrical charge. A pair of elastometric or magnetic dampers (not shown) is located each at the end of each of the chambers. These dampers provide an elastic force (in the case of a spring) or a repulsive magnetic force (in the case of a magnet) to conserve the residual momentum of the charging magnet once it has traveled past the wire coils and thereby facilitate charging.

Figure 2:
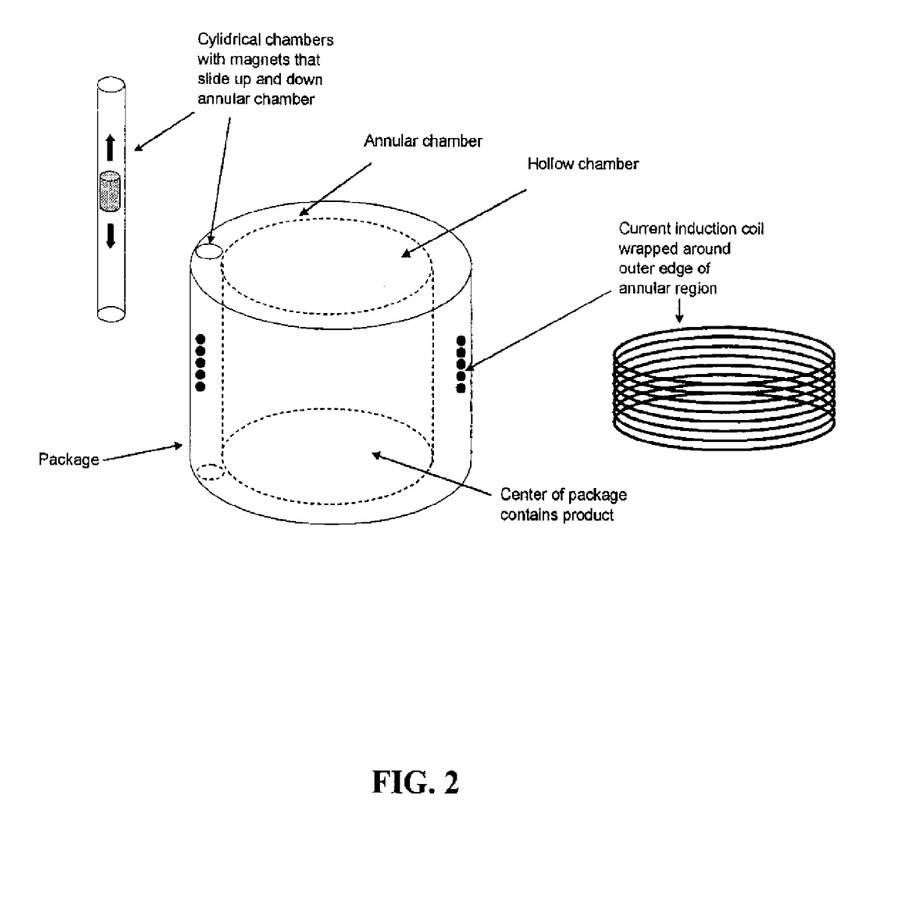

FIG. 2 shows an alternative simplified perspective of another package configuration similar to that described in FIG. 1. FIG. 2 employs a separate and distinct cylindrical chamber or chambers housed within an annular chamber. Each cylindrical chamber contains a cylindrical magnet that freely slides up and down the length of the cylindrical chamber. When the package is shaken, the cylindrical magnet travels past the induction coil resulting in the creation of an electrical charge. A pair of elastometric or magnetic dampers (not shown) is located each at the end of each of the chambers. These dampers provide an elastic force (in the case of a spring) or a repulsive magnetic force (in the case of a magnet) so as to conserve the residual momentum of the charging magnet once it has traveled past the wire coils and thereby facilitate charging.

Figure 3:
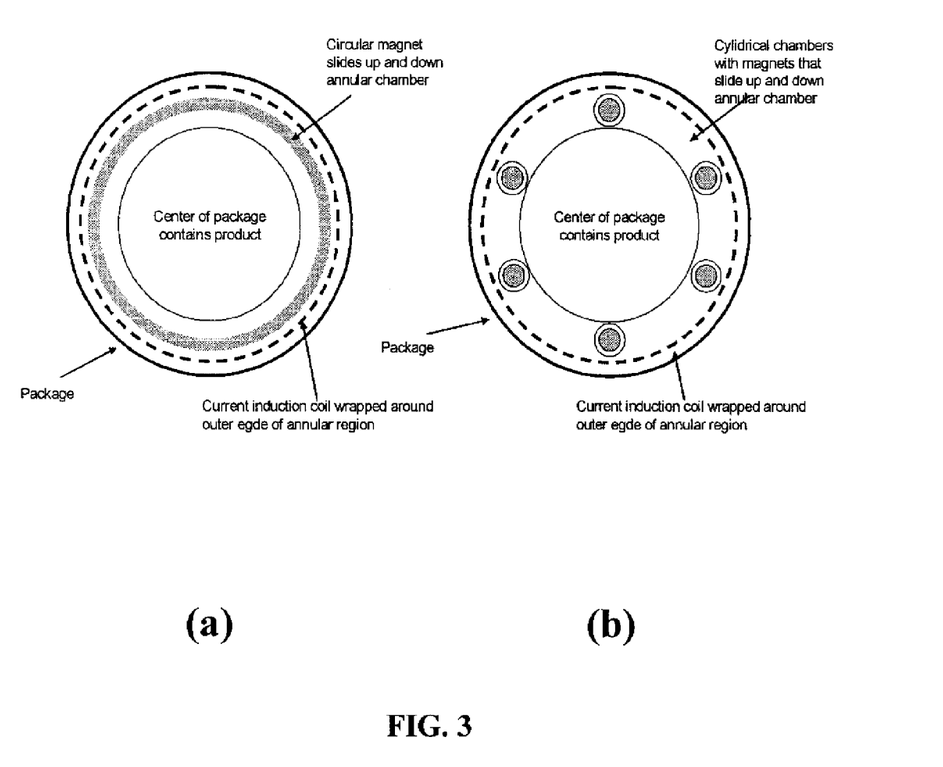
FIGS. 3(a) and 3(b) are simplified top views of the renewable energy packaging device.

FIG. 3(a) is a top view of FIG. 1 showing the position of the circular magnet and the induction coil.

FIG. 3(b) is a top view of FIG. 2 showing the position of the cylindrical magnets and the induction coil.

Figure 4:
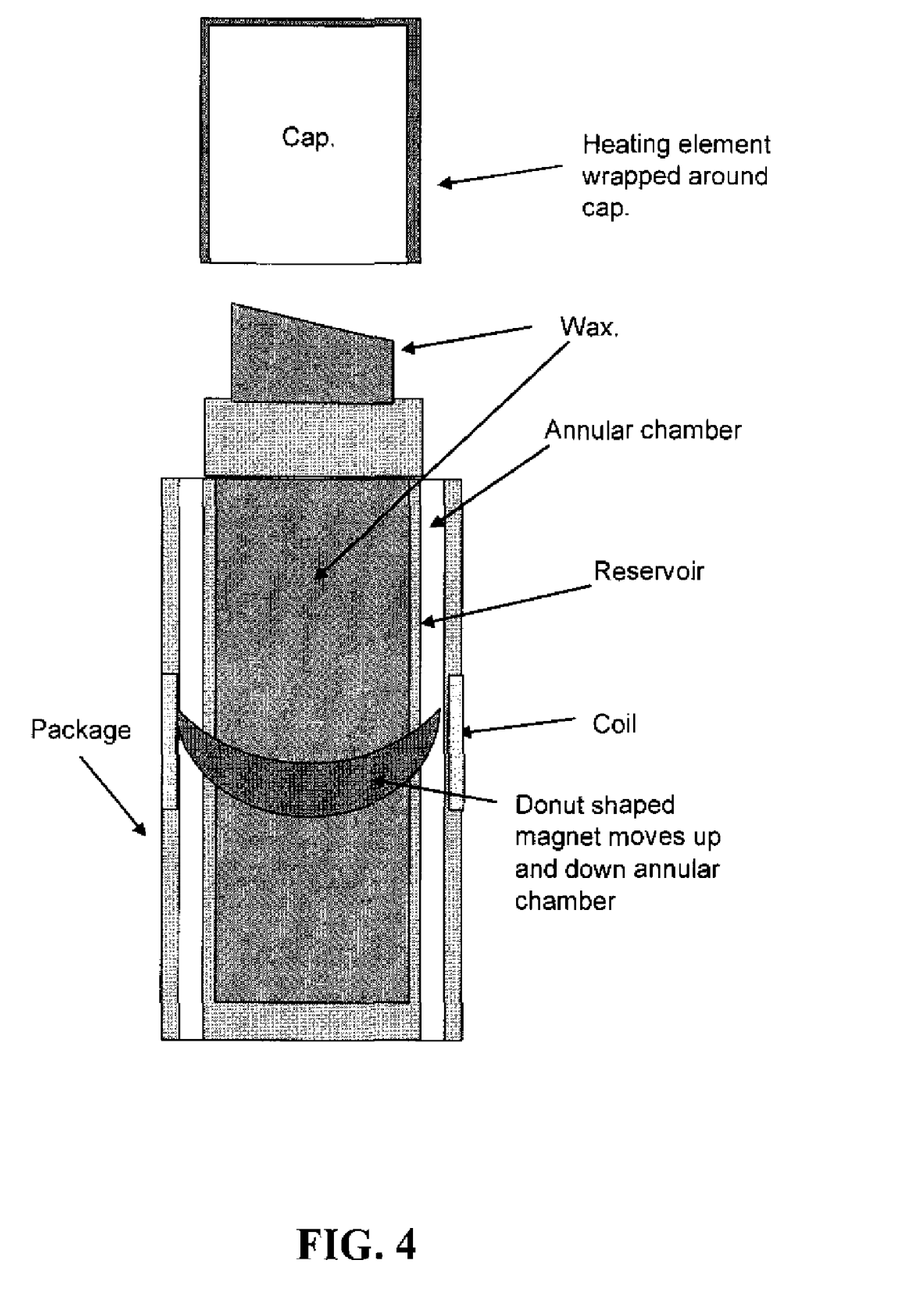
FIG. 4 is a simplified side view of an electromagnetically heated device for targeted application of depilatory waxes.

FIG. 4 is a side view of a self-heating package having a coil anchored in the outer wall of the packager a donut shaped magnet housed within an annular chamber such that it is free to slide the length of the package. The cosmetic composition, in this case a retractable depilatory wax stick, is housed in the hollow or reservoir. The electrical charge is generated by shaking the package. The charge remains stored in a capacitor (not shown) until a switch (not shown) is activated. Upon activation, an electrical current flows through the heating element in the cap and melts a targeted area of the depilatory stick.

The configuration can also be used for other thermally sensitive products such as lipsticks or sunscreen sticks. Heating the product alters its physical or chemical properties, allowing it to be applied more effectively or easily. Upon application, the product cools and returns to its original state and regains its original physical or chemical properties.

Figure 5:
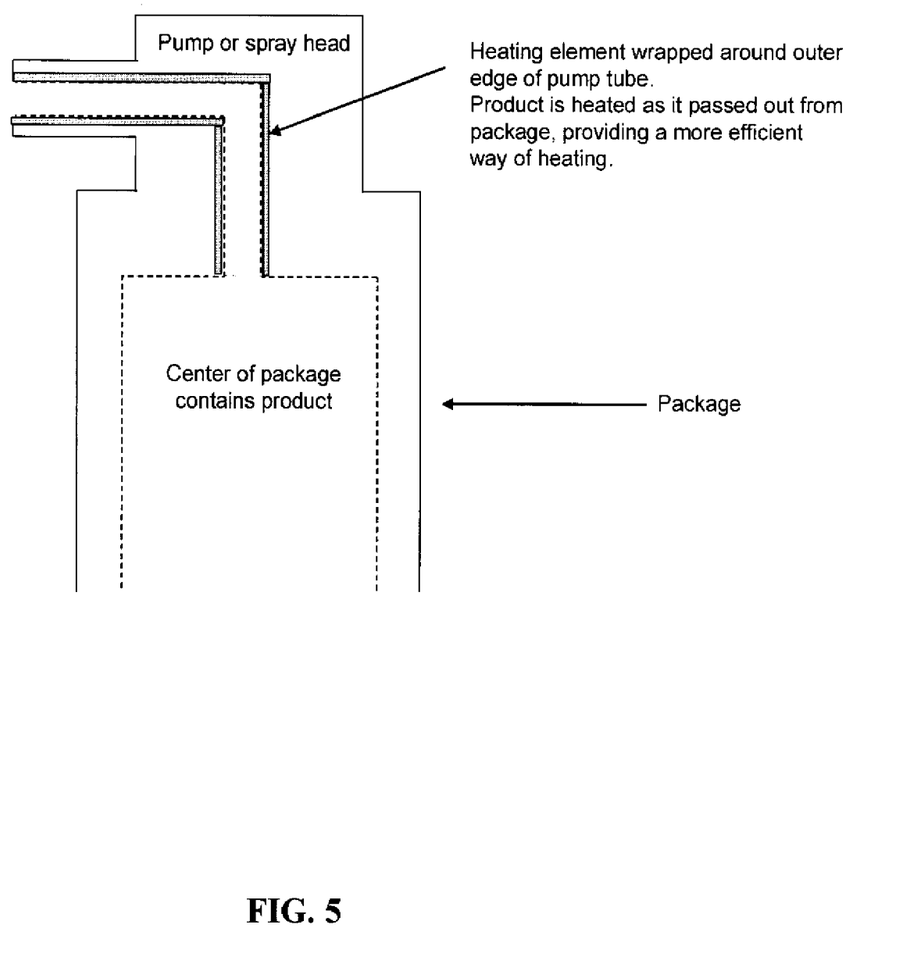
FIG. 5 is a simplified side view of a device wherein a product is heated as it passes through a pump or spray head.

FIG. 5 is a side view of a device wherein the cosmetic product is heated as it passes out of a pump or spray head via a heating element wrapped around the outer edge of a pump tube. The heating element is powered by the electrical charge stored in a capacitor (not shown). Potential applications include but are not limited to skin and shave creams. Heating the product may alter the physical or chemical properties of the product, for example, by allowing it to be applied more effectively or easily. Upon application, the product cools and returns to its original state and regains its original physical or chemical properties.

Figure 6:
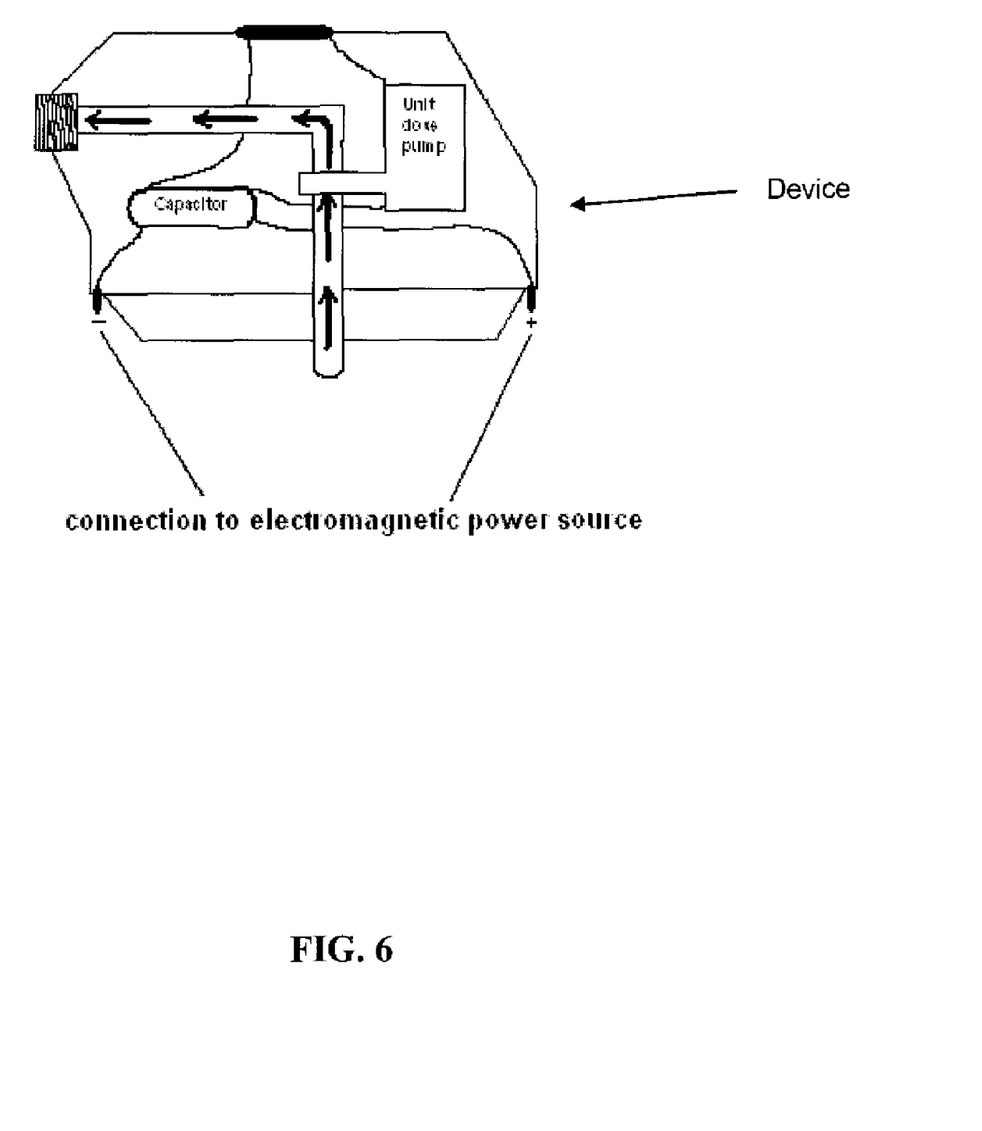
FIG. 6 is a simplified side view of a device with a unit dose pump powered by a charge stored in a capacitor.

FIG. 6 is a simplified side view of a powered device with a unit dose pump powered by an electrical charge stored in a capacitor. Powered devices that could be used include an electric motor to propel and dispense a lipstick or an antiperspirant/deodorant stick.

Figure 7:
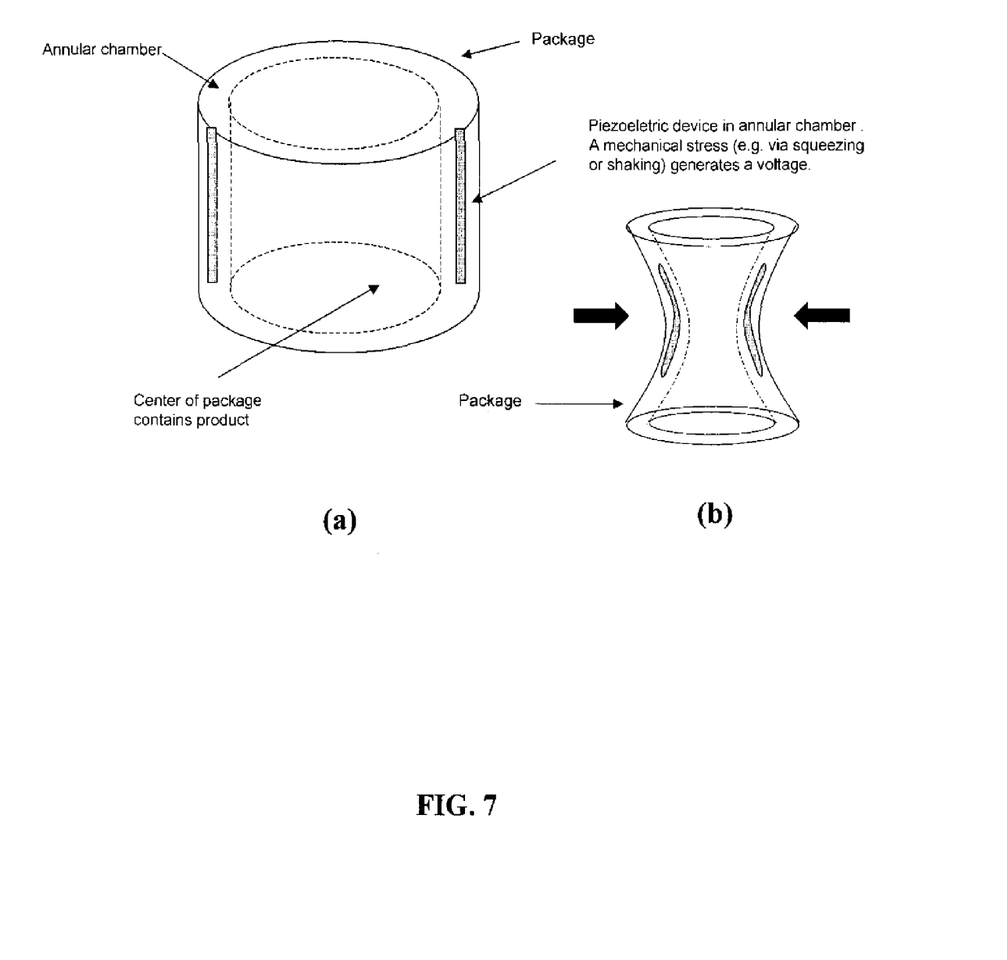
FIGS. 7(a) and 7(b) are simplified perspective diagrams of a renewable energy packaging device.

FIG. 7(a) is a simplified perspective view of a renewable energy packaging device with i) a hollow volume to store the material to be delivered, ii) a piezoelectric circuit element, iii) an electronics assembly for storage of generated energy, and iv) an element that utilizes the current generated by the stored charge. When the device is agitated (e.g. shaken or squeezed, as shown in FIG. 7(b)) a mechanical stress is applied to the piezoelectric element which in turn generates voltage. The electronics assembly within the device includes a capacitor for storing the electric charge, and a means for conducting current to charge the capacitor. Various elements, such as but not limited to a heat exchanger, electric motor or pump, can be connected to the capacitor by means of a switch (which can be electric or magnetic), and utilize the current generated by the stored charge when the switch is activated.

Figure 8:
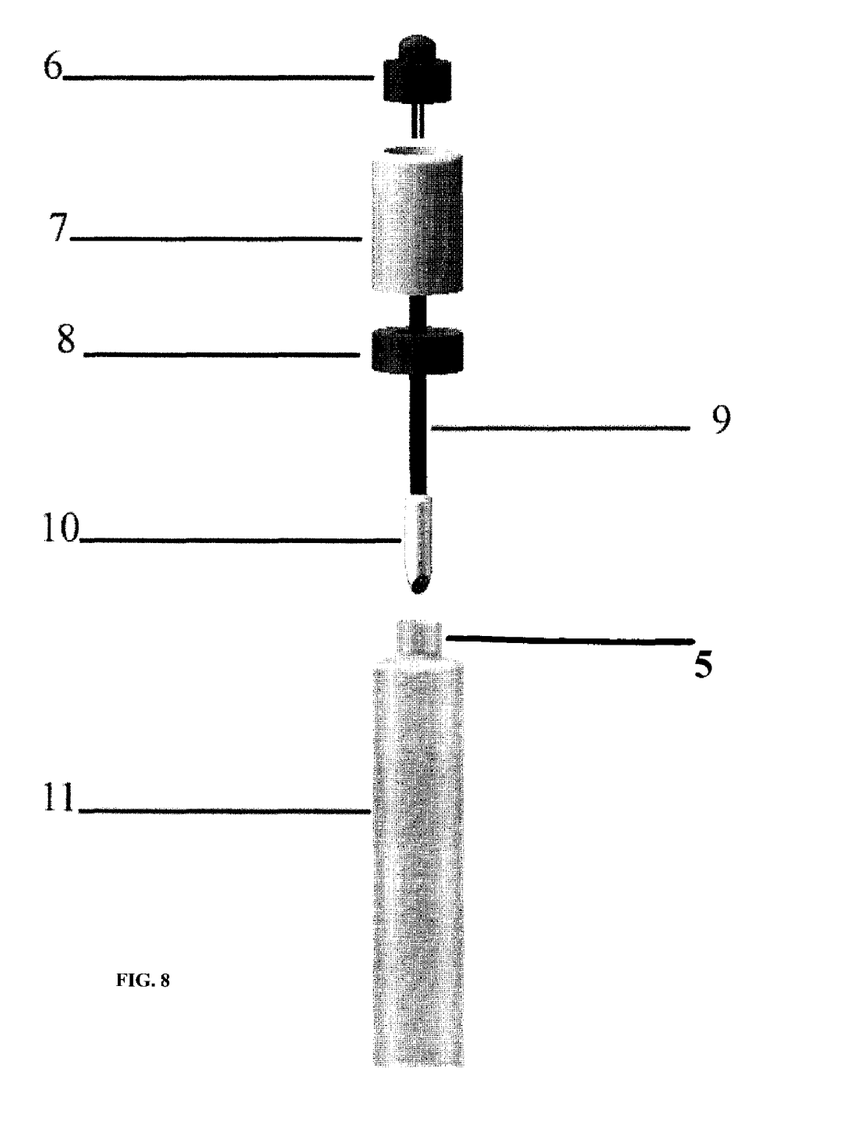
FIG. 8 is an exploded side view of a package incorporating a piezoelectric energy system.

FIG. 8 is a simplified exploded front view of a cosmetic package 5 with an applicator wherein button 6 is mounted on a piezoelectric element (not shown) housed in cap assembly 7 which is connected to an ultrasonic transducer 8 that converts electrical energy into acoustic energy providing a vibratory response that is transferred through rod assembly 9 to applicator 10 that is inserted in package 11 which holds the cosmetic composition (not shown).

Figure 9:
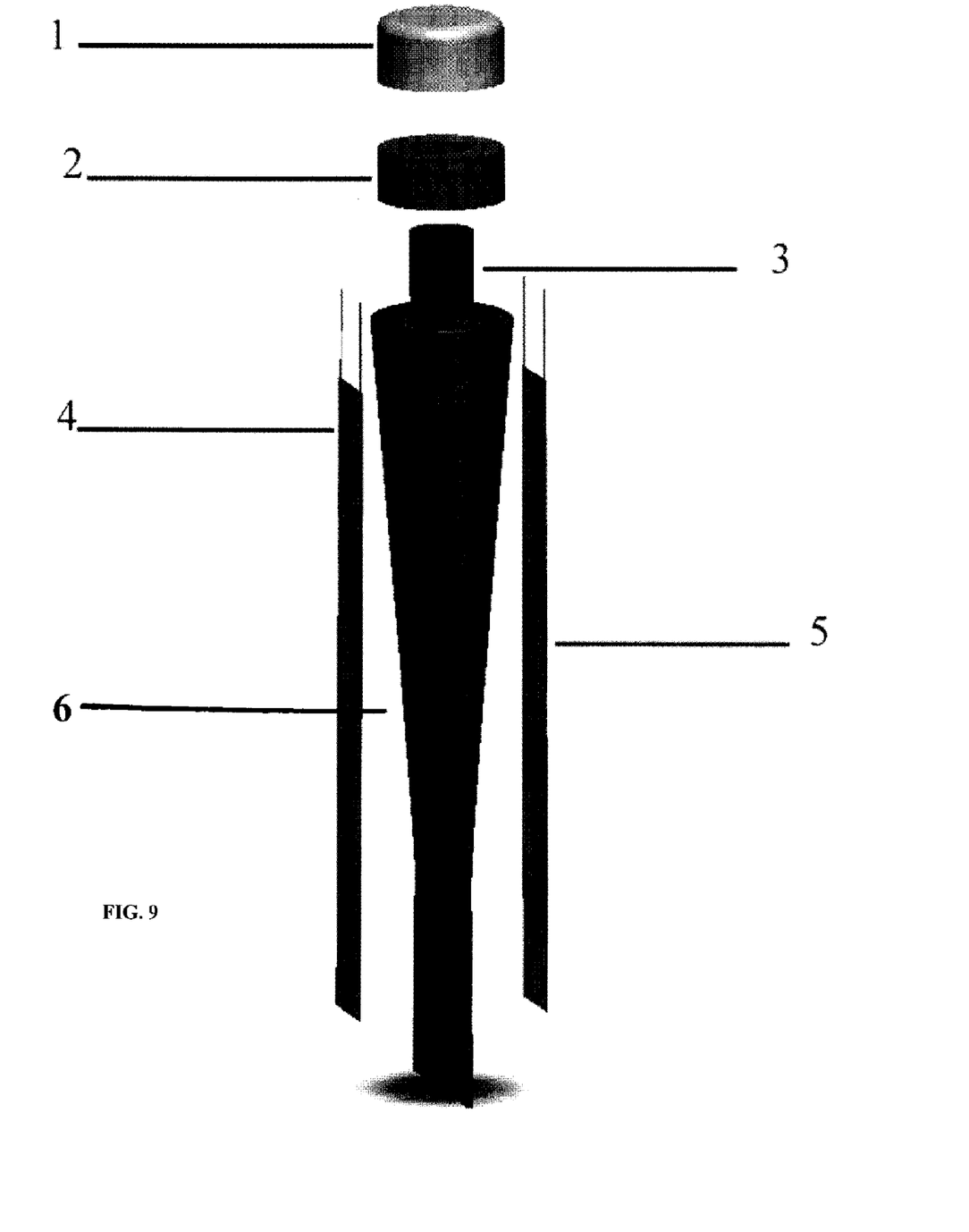
FIG. 9 is an exploded side view of a squeeze type package housing a piezoelectric energy system.

FIG. 9 is a simplified exploded front view of a squeeze type cosmetic tube 6 housing a piezoelectric energy system wherein cap 1 is mounted on ring 2 which is adapted to receive energy from a piezoelectric element. Ring 2 is mounted on tube 3 which contains a cosmetic composition (not shown) and is flanked on each side by piezoelectric elements 4 and 5 that are embedded in the outer wall of the squeeze tube. When the squeeze tube is squeezed or massaged, the piezoelectric elements 4 and 5 are activated by the mechanical stress that creates the electrical energy needed to activate the squeeze tube.

What is claimed is:

1. A self-contained voltage generating system, comprising:
a package or device for housing a product;
at least one piezoelectric element incorporated in said package or device that generates a source of voltage;
means for activating the piezoelectric element to generate the source of voltage; and
means for utilizing the voltage generated by the piezoelectric element,
wherein the voltage generated by the piezoelectric element alters the theology of a cosmetic composition.

2. The self-contained voltage generating system of claim 1, wherein the package or device comprises a first enclosed space for housing the product, and a second enclosed space surrounding the first enclosed space.

3. The self-contained voltage generating system of claim 2, wherein the first enclosed space is contacted with an induction coil and the second enclosed space houses magnetic means that oscillate within said second enclosed space, thereby generating an electric charge in the induction coil.

4. The self-contained voltage generating system of claim 3, wherein the package or device also includes a capacitor for storing the electric charge, a rectifier connected to the capacitor and means for conducting current flowing in the coil to charge the capacitor.

5. The self-contained voltage generating system of claim 4, wherein the package or device incorporates means for performing a function selected from the group consisting of operating a motor, operating a pump, providing ultrasonic energy, furnishing light, providing acoustic energy, and providing vibration energy.

6. The self-contained voltage generating system of claim 1, wherein the piezoelectric element is selected from the group consisting of discrete particles, piezoelectric fibers, filaments, transducers, and actuators.

7. The self-contained voltage generating system of claim 6, wherein the piezoelectric element is bundled in a parallel array to make a transducer.

8. The self-contained voltage generating system of claim 6, wherein the piezoelectric element is laid down in a flat monolayer to serve as an actuator.

9. The self-contained voltage generating system of claim 1, wherein the piezoelectric element generates voltage when subjected to mechanical stress.

10. The self-contained voltage generating system of claim 9, wherein the mechanical stress is produced from motion, vibration, or compression.

11. The self-contained voltage generating system of claim 1, wherein the package or device houses a cosmetic product selected from the group consisting of self-heating cosmetic applicators for mascara and lip application and for deposition of dry foundation; self-heating pad applicators for creams and lotions for skin treatment and personal care; mechanical movement applicators for mascara and lip applications; mechanical movement pads for exfoliation treatments for the skin; self-heating hair brushes for personal care and grooming that heat up due to the mechanical action of pulling the brush through the hair and/or the bending of the piezoelectric impregnated bristles as the bristles contact the head; color changing cosmetics for skin, hair and lips; self-illuminating packages such as fragrance bottles and compacts with mirrors that allow the person to view an activity such as the application of a cosmetic; and electric field producing packages or applicators for enhancing skin penetration or release of a biologically active agent from a carrier.

12. The self-contained voltage generating system of claim 11, wherein the cosmetic product is a self-heating hairbrush.

13. The self-contained voltage generating system of claim 11, wherein the cosmetic product is a self-heating cosmetic applicator selected from the group consisting of a mascara brush and lip applicator.

14. The self-contained voltage generating system of claim 13, wherein the voltage produced by the piezoelectric element provides a source of heat and acoustically driven vibration energy to the cosmetic applicator during movement of the applicator to improve cosmetic application or to assist in transferring a cosmetic composition from the applicator to a recipient.

15. The self-contained voltage generating system of claim 13, wherein the voltage produced by the piezoelectric element provides vibration energy to dispense or distribute the cosmetic composition from the cosmetic applicator.

16. The self-contained voltage generating system of claim 11, wherein the cosmetic product is a self-heating nail polish applicator brush.

17. The self-contained voltage generating system of claim 1, wherein the voltage generated by the piezoelectric element provides acoustic energy.

18. The self-contained voltage generating system of claim 17, wherein the piezoelectric element is integrated into a hairbrush used to remove water from the hair by converting the voltage into acoustic energy to thereby induce vibration that displaces water from a hair follicle.

19. The self-contained voltage generating system of claim, 1, wherein the package or device houses a cosmetic product selected from the group consisting of skin pads, sponges, nail polish brushes, massage bars, skin brushes and wand type applicators to provide a vibration effect.

20. The self-contained voltage generating system of claim 19, wherein the vibration effect is used to perform functions selected from the group consisting of massage therapy, spread or distribute a cosmetic composition, and to serve as an indicator to mark or monitor an event related to the human body.

21. The self-contained voltage generating system of claim 20, wherein the piezoelectric element is flexible and incorporated into a muscle wrap to monitor the level of muscle tension.

22. The self-contained voltage generating system of claim 1, wherein the piezoelectric element is used to energize a self-contained ultrasonic mixer in a cosmetic product.

23. The self-contained voltage generating system of claim 1, wherein the piezoelectric element generates sufficient voltage to energize a motor contained in the package or device wherein said motor provides mechanical movement selected from the group consisting of rotation, agitation, vibration and linear movement.

24. The self-contained voltage generating system of claim 23, wherein the mechanical movement is applied to a cosmetic composition selected from the group consisting of creams, lotions, and gels.

25. The self-contained voltage generating system of claim 1, wherein the piezoelectric element generates a voltage that provides a source of light.

26. The self-contained voltage generating system of claim 25, wherein the package or device is a product selected from the group consisting of compact mirrors, cosmetic applicators, and other cosmetic packages.

27. The self-contained voltage generating system of claim 1, wherein the piezoelectric element is activated by mechanical movement to supply voltage for cosmetic products selected from the group consisting of self-mixing packages, self-heating packages and self-illuminating packages.

28. The self-contained voltage generating system of claim 27, wherein the voltage generated by the piezoelectric element alters the rheology of the cosmetic composition by catalyzing phase transition of the cosmetic composition.

29. The self-contained voltage generating system of claim 1, wherein the voltage generated by the piezoelectric element generates acoustic energy to produce sound waves that release encapsulated material in a cosmetic composition.

30. The self-contained voltage generating system of claim 29, wherein the encapsulated material is selected from the group consisting of solids, semi-solids, and liquids.

31. The self-contained voltage generating system of claim 1, wherein the voltage generated by the piezoelectric element provides energy selected from the group consisting of heat energy and vibration energy that is used to release a cosmetic composition from an applicator applied in contact with the skin of a person.

32. The self-contained voltage generating system of claim 1, wherein the voltage generated by the piezoelectric element is used to produce an electric field that activates an electrochemical reaction.

33. The self-contained voltage generating system of claim 32, wherein the electrochemical reaction is selected from the group consisting of oxidation and reduction.

34. The self-contained voltage generating system of claim 1, wherein the voltage generated by the piezoelectric element is used to promote, alter or break ionic bonds.

35. The self-contained voltage generating system of claim 1, wherein the voltage generated by the piezoelectric element is used to promote movement of electrons to deliver an effect of a set of effects.

36. The self-contained voltage generating system of claim 1, wherein the device is a hair brush containing an impregnated piezoelectric element that generates an electric field to discharge static electricity associated with fly away hair.

37. The self-contained voltage generating system of claim 1, wherein the voltage generated by the piezoelectric element provides an electric field in a cosmetic product used for site specific dermal penetration by disruption of the skin of a person.

38. The self-contained voltage generating system of claim 37, wherein the dermal penetration of the skin is accomplished by iontophoresis.

39. The self-contained voltage generating system of claim 1, wherein the piezoelectric elements exist as discrete particles within a cosmetic composition that exhibits a permanent dipole moment.

40. The self-contained voltage generating system of claim 39 wherein the permanent dipole moment is used to produce properties selected from the group consisting of increased colloidal stability, increased photostability, change in color, and increased repulsion of solvent.

41. The self-contained voltage generating system of claim 1, wherein the package or device houses cosmetic products selected from the group consisting of insect repellents, anti-aging creams, facial masks, lipsticks, shave creams, depilatories, skin protectants, moisturizers, hair care products, toothpaste, anti-fungal powders, skin patches, lip balms and personal cleansing wipes.

42. A self-contained voltage generating system, comprising:
    a package or device for housing a product;
    at least one piezoelectric element incorporated in said package or device that generates a source of voltage;
    means for activating the piezoelectric element to generate the source of voltage; and
    means for utilizing the voltage generated by the piezoelectric element,
    wherein the package or device houses a cosmetic product selected from the group consisting of self-heating cosmetic applicators for mascara and lip application and for deposition of dry foundation; self-heating pad applicators for creams and lotions for skin treatment and personal care; mechanical movement applicators for mascara and lip applications; mechanical movement pads for exfoliation treatments for the skin; self-heating hair brushes for personal care and grooming that heat up due to the mechanical action of pulling the brush through the hair and/or the bending of the piezoelectric impregnated bristles as the bristles contact the head; color changing cosmetics for skin, hair and lips; self-illuminating packages such as fragrance bottles and compacts with mirrors that allow the person to view an activity such as the application of a cosmetic; and electric field producing packages or applicators for enhancing skin penetration or release of a biologically active agent from a carrier.

43. The self-contained voltage generating system of claim 42, wherein the cosmetic product is a self-heating hairbrush.

44. The self-contained voltage generating system of claim 42, wherein the cosmetic product is a self-heating cosmetic applicator selected from the group consisting of a mascara brush and lip applicator.

45. The self-contained voltage generating system of claim 44, wherein the voltage produced by the piezoelectric element provides a source of heat and acoustically driven vibration energy to a cosmetic applicator during movement of the applicator to improve cosmetic application or to assist in transferring a cosmetic composition from the applicator to a recipient.

46. The self-contained voltage generating system of claim 44, wherein the voltage produced by the piezoelectric element provides vibration energy to dispense or distribute the cosmetic composition from the cosmetic applicator.

47. The self-contained voltage generating system of claim 42, wherein the cosmetic product is a self-heating nail polish applicator brush.

48. The self-contained voltage generating system of claim 42, wherein the piezoelectric element generates voltage when subjected to mechanical stress.

49. The self-contained voltage generating system of claim 48, wherein the mechanical stress is produced from motion, vibration, or compression.

50. The self-contained voltage generating system of claim 42, wherein the voltage generated by the piezoelectric element provides acoustic energy.

* * * * *